(12) United States Patent
Sethuraman

(10) Patent No.: US 6,706,128 B2
(45) Date of Patent: Mar. 16, 2004

(54) METHOD OF PROVIDING VOID SPACE IN GYPSUM WALLBOARD AND IN A GYPSUM CORE COMPOSITION

(75) Inventor: Gopalakrishnan Sethuraman, East Amherst, NY (US)

(73) Assignee: National Gypsum Properties, LLC, Charlotte, NC (US)

( * ) Notice: Subject to any disclaimer, the term of this patent is extended or adjusted under 35 U.S.C. 154(b) by 146 days.

(21) Appl. No.: 09/887,284

(22) Filed: Jun. 22, 2001

(65) Prior Publication Data

US 2003/0010419 A1 Jan. 16, 2003

(51) Int. Cl.$^7$ ................................................. B01F 17/00
(52) U.S. Cl. ........................... 156/43; 156/39; 106/680; 106/772; 264/42
(58) Field of Search ..................... 156/43, 39; 106/680, 106/772; 264/42

(56) References Cited

U.S. PATENT DOCUMENTS

| | | | |
|---|---|---|---|
| 4,156,615 A | | 5/1979 | Cukier ........................ 106/111 |
| 4,455,271 A | * | 6/1984 | Johnson ........................ 264/42 |
| 4,618,370 A | | 10/1986 | Green et al. ................. 106/111 |
| 5,240,639 A | | 8/1993 | Diez et al. ................... 252/307 |
| 5,643,510 A | | 7/1997 | Sucech ....................... 264/40.1 |
| 5,714,001 A | | 2/1998 | Savoly et al. ............... 106/678 |
| 5,879,825 A | | 3/1999 | Burke et al. ................ 428/703 |

FOREIGN PATENT DOCUMENTS

EP        0 336 749 A2     6/1989     .................... 17/4

OTHER PUBLICATIONS

Gopalakrishnan Sethuraman, U.S. patent application Ser. No. 09/427,982 filed Oct. 27, 1999 entitled "Static Foam Generating Apparatus and Method".
PCT Search Report dated Oct. 11, 2002.

* cited by examiner

Primary Examiner—Jeff H. Aftergut
Assistant Examiner—Todd J. Kilkenny
(74) Attorney, Agent, or Firm—Howrey Simon Arnold & White, LLP; Anthony Nimmo

(57) ABSTRACT

The invention provides a method of providing void spaces in gypsum wallboard and in a gypsum core composition such that the weight of the gypsum product is reduced without deleteriously affecting its mechanical properties. More specifically, the invention provides a method of providing void spaces in a gypsum wallboard comprising the step of adding air bubbles having different relative stabilities to a gypsum slurry, wherein the less stable air bubbles are sufficiently unstable such that they coalesce on contact with each other in the slurry to form larger air bubbles, and the weight ratio of the less stable air bubbles to the more stable air bubbles initially added to the slurry is such that there are a sufficient number of more stable air bubbles to prevent a majority of the less stable air bubbles from becoming large enough to rupture before the slurry sets sufficiently to prevent the slurry from filling void spaces left by ruptured bubbles. The method further includes the steps of mixing the air bubble-containing gypsum slurry to distribute the air bubbles throughout the slurry to form a core composition of gypsum wallboard, depositing the core composition on a cover sheet, and, applying a second cover sheet over the core composition to form a gypsum wallboard.

5 Claims, 2 Drawing Sheets

METHOD OF PROVIDING VOID SPACE IN GYPSUM WALLBOARD AND IN A GYPSUM CORE COMPOSITION

BACKGROUND OF THE INVENTION

1. Field of the Invention

The present invention relates generally to the production of low weight, high strength gypsum wallboard and gypsum core compositions. More specifically, the invention is directed to a method of providing void spaces in gypsum wallboard and in a gypsum core composition.

2. Description of Related Technology

A common method of constructing walls and ceilings includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional boards made from wet plaster methods, is desirable because the installation of wallboard is ordinarily less costly and less cumbersome when compared to the installation of conventional plaster walls.

A major ingredient of the gypsum wallboard core (hereinafter "wallboard core" or "core") is calcium sulfate hemihydrate, commonly referred to as "calcined gypsum," "stucco," or "plaster of Paris." Stucco has a number of desirable physical properties including, but not limited to, its fire resistance, thermal and hydrometric dimensional stability, compressive strength, and neutral pH. Typically, stucco is prepared by drying, grinding, and calcining natural gypsum rock (i.e., calcium sulfate dihydrate). The drying step in the manufacture of stucco includes passing crude gypsum rock through a rotary kiln to remove any free moisture present in the rock. The dried rock is then passed through a roller mill (a type of pulverizer), wherein the rock is ground or comminuted to a desired fineness. The degree of comminution is determined by the ultimate use. The dried, fine-ground gypsum can be referred to as "land plaster," regardless of its intended use.

The land plaster is used as feed in calcination processes for conversion to stucco. The calcination step in the manufacture of stucco is performed by heating the land plaster to liberate a portion of the chemically bound water molecules. The calcination of stucco can generally be described by the following chemical equation which shows that heating calcium sulfate dihydrate yields calcium sulfate hemihydrate (stucco) and water vapor:

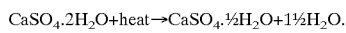

$$CaSO_4 \cdot 2H_2O + heat \rightarrow CaSO_4 \cdot \tfrac{1}{2}H_2O + 1\tfrac{1}{2}H_2O.$$

This calcination process step is performed in a "calciner," of which there are several types known by those of skill in the art.

Uncalcined calcium sulfate (i.e., land plaster) is the "stable" form of gypsum. However, calcined gypsum, or stucco, has the desirable property of being chemically reactive with water, and will "set" rather quickly when the two are mixed together. The setting reaction is a reversal of the above-described chemical reaction that occurs during the calcination step, and is generally described by the following chemical equation showing that calcium sulfate hemihydrate is rehydrated to its dihydrate state:

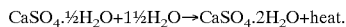

$$CaSO_4 \cdot \tfrac{1}{2}H_2O + 1\tfrac{1}{2}H_2O \rightarrow CaSO_4 \cdot 2H_2O + heat.$$

The actual time required to complete the setting reaction generally depends upon the type of calciner and the type of gypsum rock that is used to produce the gypsum, and can be controlled within certain limits by the use of additives such as, for example, retarders, set accelerators, and/or stabilizers. The time required for rehydration can be as little as about two minutes to as long as about eight hours depending on the quantity of retarders, set accelerators, and/or stabilizers present.

Generally, wallboard is produced by enclosing a core of an aqueous slurry of calcined gypsum and other materials between two large sheets of board cover paper. Methods for the production of gypsum wallboard generally are described, for example, by Michelsen, T. "Building Materials (Survey)," *Kirk-Othmer Encyclopedia of Chemical Technology*, (1992 4th ed.), vol. 4, pp. 618–619, the disclosure of which is hereby incorporated herein by reference.

A conventional process for manufacturing the core composition of gypsum wallboard initially includes the premixing of dry ingredients in a high-speed mixing apparatus. The dry ingredients can include calcium sulfate hemihydrate (stucco), an accelerator, and an antidesiccant (e.g., starch). The dry ingredients are mixed together with a "wet" (aqueous) portion of the core composition in a pin mixer apparatus. The wet portion can include a first component, commonly referred to as a "paper pulp solution," that includes a mixture of water, paper pulp, and, optionally, one or more fluidity-increasing agents, and set retarders. The paper pulp solution provides a major portion of the water that forms the gypsum slurry of the core composition. A second wet component can include a mixture of strengthening agents, foaming agents, and other conventional additives, if desired. Together, the aforementioned dry and wet portions comprise an aqueous gypsum slurry that eventually forms the gypsum wallboard core.

In the production of exterior sheathing and moisture-resistant wallboard cores, various materials, such as silicone water repellents, waxes, and asphalt emulsions, can be incorporated into the gypsum wallboard core to impart increased water absorption resistance to the board. These materials are typically supplied as water emulsions to facilitate ease of incorporation into the board core, and can be added directly into the mixing apparatus or incorporated into the pulp solution prior to addition to the mixing apparatus.

After the aqueous gypsum slurry is prepared, the slurry and other desired ingredients are continuously deposited to form a gypsum wallboard core slurry between two continuously-supplied moving sheets of cover paper. Various types of cover paper (or "cover sheets") are known in the art. The two cover sheets typically comprise a pre-folded face paper and a backing paper. As the slurry is deposited onto the face paper, the backing paper is brought down atop the deposited core slurry and bonded to the prefolded edges of the face paper. The core slurry is then allowed to cure or set (i.e., react with the water present in the aqueous slurry), whereby calcium sulfate hemihydrate is converted to calcium sulfate dihydrate.

The setting reaction produces gypsum crystals which are interwoven. The resulting crystal-to-crystal interactions contribute to the strength of the wallboard core. The gypsum crystals also preferably interlock with paper fibers protruding from the surface of the cover sheets, thereby bonding the cover sheets to the wallboard core. This bonding-type interaction also increases the strength of the wallboard product.

After the core has set, the formed sheet is dried to remove any excess water, and the board is cut into standard sizes. Standardized sheets (or panels) of wallboard typically are about four feet (about 1.22 meters) wide and about 8 feet to about 16 feet (about 2.4 meters to about 4.9 meters) in length. Sheets typically are available in thicknesses varying in a range of about ¼ inch to about one inch (about 0.6 centimeters to about 2.6 centimeters).

In order to provide satisfactory strength, commercially-available gypsum wallboard generally requires a density of about 1675 to 1700 pounds per thousand square feet (lbs/MSF) of one-half inch board. Because heavy or high-density gypsum wallboards are more costly and difficult to manufacture, transport, store, and manually install at job sites when compared with lighter or low-density boards, various attempts have been made to reduce board weight and density without sacrificing board strength. Often, however, where wallboard is formulated to have a density less than about 1675 to 1700 lbs/MSF of one-half inch board, the resulting strength is unacceptable for commercial sale.

It has been previously disclosed that reduced density wallboard can be obtained by mixing an aqueous foam into the gypsum slurry. The density of the wallboard is reduced because the foam introduces air voids into the gypsum wallboard core composition. However, if the foam substantially degrades during mixing of the gypsum slurry and/or while the gypsum core is setting, the gypsum slurry will fill those void spaces left by ruptured bubbles, and a reduced board weight will not be achieved. Furthermore, many of the lighter and less dense wallboard products obtained by incorporating foams into the gypsum slurry possess inferior mechanical properties which render them ill-suited for commercial use.

For example, U.S. Pat. No. 4,156,615 to Cukier, the disclosure of which is hereby incorporated by reference, discloses a foaming agent which can be used to introduce air voids into a gypsum wallboard. However, gypsum wallboard produced with this surfactant blend must be formulated at heavier board weights (approximately 1675 lbs/MSF) in order to meet ASTM nail pull standards. Further, the foaming agent of the '615 patent produces more stable air bubbles upon foaming. Because a large number of stable air bubbles are introduced into the gypsum slurry, a large number of small voids are provided in the gypsum wallboard, and the mechanical properties of the produced gypsum board are deleteriously affected.

U.S. Pat. No. 5,240,639 to Diez et al., the disclosure of which is hereby incorporated by reference, also discloses a foaming agent which can be used to introduce air voids into a gypsum wallboard. Gypsum wallboard produced with this surfactant blend also must be formulated at heavier board weights (approximately 1675 lbs/MSF) in order to meet ASTM nail pull requirements. Further, the foaming agent of the '639 patent produces less stable air bubbles which frequently coalesce and rupture during mixing of the gypsum slurry and/or while the gypsum slurry is setting. As a consequence, greater amounts of this foaming agent must be used to achieve significant weight reduction in gypsum wallboards.

U.S. Pat. No. 5,643,510 to Sucech, the disclosure of which is hereby incorporated by reference, discloses a process for producing "foamed" gypsum board wherein a stable foaming agent comprising alkyl ether sulfates and an unstable foaming agent comprising alkyl sulfates are blended and introduced into a gypsum slurry. The foaming agents of the '615 patent and of the '639 patent are both disclosed to be stable foaming agents.

It therefore remains desirable to provide void spaces in a gypsum wallboard such that the board weight is reduced without deleteriously affecting the mechanical properties of the gypsum wallboard.

It is also desirable to provide void spaces in a gypsum wallboard wherein the air bubbles do not prematurely rupture thereby allowing the gypsum slurry to fill the void spaces left by the ruptured bubbles.

Furthermore, it would be desirable to produce high-strength gypsum wallboard having weights and densities generally less than those produced by conventional methods. Reduced weight and density boards, however, should meet industry standards and have strengths similar to, or greater than, conventional wallboard. Moreover, such wallboard also should be able to be manufactured using high-speed manufacturing apparatus and not suffer from other negative side effects. For example, such high-strength wallboard should be able to set and dry within a reasonable period of time.

SUMMARY OF THE INVENTION

The present invention provides a method of providing void spaces in a gypsum wallboard such that the board weight is reduced without deleteriously affecting the mechanical properties of the gypsum wallboard.

The invention also provides a method of providing void spaces in a gypsum wallboard wherein air bubbles do not prematurely rupture during mixing of the gypsum slurry and/or during the setting of the gypsum slurry, thereby allowing the gypsum slurry to fill the void spaces left by the ruptured bubbles.

The invention further provides a method of providing void spaces in a gypsum wallboard such that high-strength gypsum wallboard having weights and densities generally less than those produced by conventional methods is produced.

In accordance with one aspect of the present invention, a method of providing void spaces in a gypsum wallboard comprises a step of adding air bubbles to a gypsum slurry. The slurry typically comprises calcium sulfate hemihydrate and sufficient water to hydrate the calcium sulfate hemihydrate. Air bubbles can be formed by foaming a first foaming agent and a second foaming agent in water. The first and second foaming agents produce air bubbles that differ in stability. More specifically, the first foaming agent produces less stable air bubbles and the second foaming agent produces more stable air bubbles. The less stable air bubbles are sufficiently unstable such that they coalesce on contact with each other in the slurry to form larger air bubbles. The weight ratio of the less stable air bubbles to the more stable air bubbles initially added to the slurry is such that there are a sufficient number of more stable air bubbles to prevent a majority of the less stable air bubbles from becoming large enough to rupture before the slurry sets sufficiently, and to prevent the slurry from filling void spaces left by ruptured bubbles. The method further includes the step of mixing the air bubble-containing gypsum slurry to distribute the air bubbles throughout the slurry. The gypsum slurry forms a core composition of the gypsum wallboard. The core composition is deposited on a cover sheet, and, a second cover sheet is applied over the resulting core composition to form a gypsum wallboard.

In accordance with an additional aspect of the present invention, a method of providing void spaces in a gypsum core composition comprises the step of adding air bubbles to a gypsum slurry. The slurry typically comprises calcium sulfate hemihydrate and sufficient water to hydrate the calcium sulfate hemihydrate. Air bubbles can be formed by foaming a first foaming agent and a second foaming agent in water. The first and second foaming agents produce air bubbles that differ in stability. More specifically, the first foaming agent produces less stable air bubbles and the second foaming agent produces more stable air bubbles. The first foaming agent is described by the chemical formula $R(OCH_2CH_2)_aOSO_3M_1$ wherein R represents linear and branched hydrocarbons having a maximum molecular weight of about 169, and mixtures thereof, a is the average number of moles of ethylene oxide per mole of foaming agent and is in the range of 0.4 and 1.3, and, $M_1$ is selected from the group consisting of sodium, potassium, magnesium, ammonium, quaternary ammonium, and mixtures thereof. The second foaming agent is described by the chemical formula $CH_3(CH_2)_bCH_2(OCH_2CH_2)_cOSO_3M_2$ wherein the average value of b is in the range of 6.5 and 7.5, c is the average number of moles of ethylene oxide per mole of foaming agent and is in the range of 1.5 and 2.5, and, $M_2$ is selected from the group consisting of sodium, potassium, magnesium, ammonium, quaternary ammonium, and mixtures thereof. The weight ratio of the first foaming agent to the second foaming agent is in the range of 75:25 to 95:5. The presence of the more stable air bubbles in the slurry increases the residence time of the less stable bubbles in the slurry, thereby preventing the premature rupturing of the less stable bubbles before the gypsum slurry sets sufficiently, and thereby preventing the slurry from filling the void spaces formed by the ruptured air bubbles. The method further includes the steps of mixing the air bubble-containing gypsum slurry to distribute the air bubbles throughout the slurry, the gypsum slurry forming a core composition of the gypsum wallboard, depositing the core composition on a cover sheet, and applying a second cover sheet over the core composition to form a gypsum wallboard.

In accordance with yet another aspect of the present invention, a method of providing void spaces in a gypsum wallboard core composition comprises a step of adding air bubbles to a gypsum slurry. The slurry typically comprises calcium sulfate hemihydrate and sufficient water to hydrate the calcium sulfate hemihydrate. Air bubbles can be formed by foaming a first foaming agent and a second foaming agent in water. The first and second foaming agents produce air bubbles that differ in stability. More specifically, the first foaming agent produces less stable air bubbles and the second foaming agent producing more stable air bubbles. The less stable air bubbles are sufficiently unstable such that they coalesce on contact with each other in the slurry to form larger air bubbles. The weight ratio of the less stable air bubbles to the more stable air bubbles initially added to the slurry is such that there are a sufficient number of more stable air bubbles to prevent a majority of the less stable air bubbles from becoming large enough to rupture before the slurry sets sufficiently, and to prevent the slurry from filling void spaces left by ruptured bubbles. The method further includes the steps of mixing the air bubble-containing gypsum slurry to distribute the air bubbles throughout the slurry, and, depositing the gypsum slurry on a substrate.

BRIEF DESCRIPTION OF THE DRAWINGS

These and other features, aspects, and advantages of the present invention will become better understood with regard to the following description, appended claims, and accompanying drawings where:

DETAILED DESCRIPTION OF PREFERRED EMBODIMENTS

In accordance with the invention, methods of providing void spaces are disclosed for use in the production of panels of gypsum wallboard. The invention further provides methods of providing void spaces in a gypsum core composition.

Figure 1:
FIG. 1 shows an electron micrograph of a gypsum board prepared with a prior art method of providing void spaces in a gypsum board; and, FIG. 2 shows an electron micrograph of a gypsum board prepared with a method of providing void spaces in a gypsum board in accordance with the invention.

FIG. 1 illustrates that the diameter of the void spaces in a gypsum board prepared by a prior art method, wherein a high density foam (16 lbs/cf) comprising Cedepal® FA-406 was used as the sole foaming agent, is approximately 0.35 to 40 microns.

Figure 2:
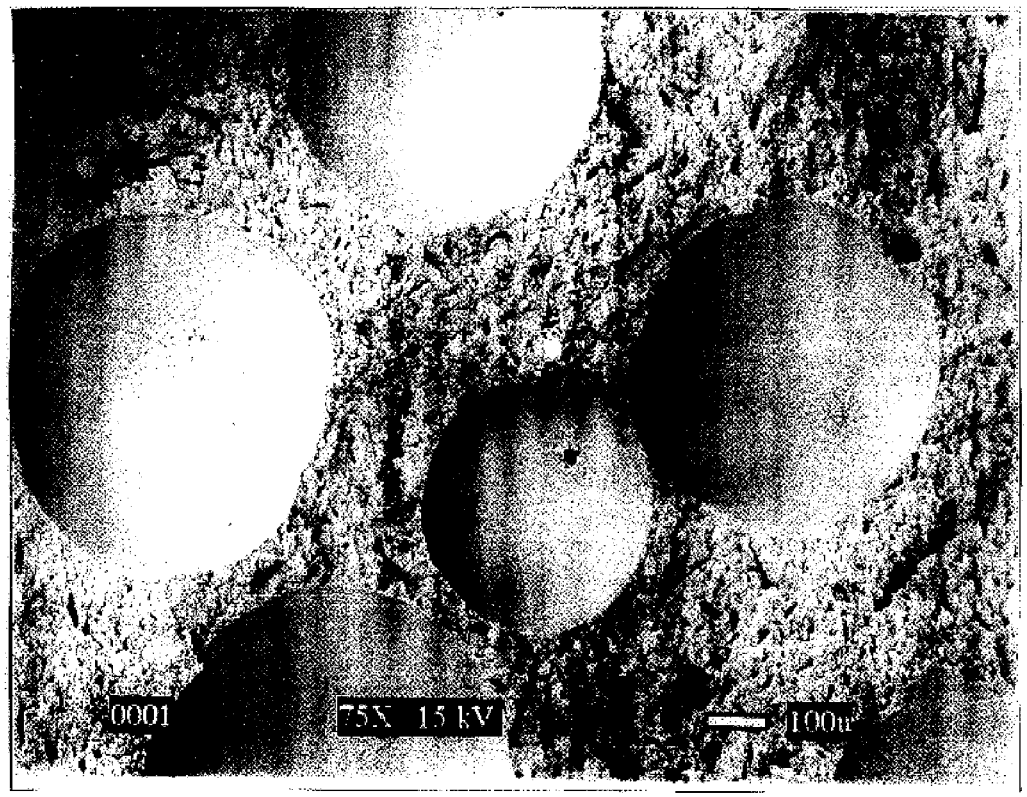

FIG. 2 demonstrates that the diameter of the void spaces provided in accordance with the methods of the invention are significantly larger, ranging from 300 to 800 microns.

The method of the invention allows a substantial reduction in board weight and density, while producing wallboard that can meet industry strength standards. By way of example only, the methods of the invention can allow for the production of high strength wallboard weighing about 1600 pounds per thousand square feet (based on one-half inch thick board), and even lower in some cases.

The preferred ingredients of the wallboard core composition of the invention will now be described in more detail. The first ingredient of the wallboard core composition of the invention is calcium sulfate hemihydrate, or stucco ($CaSO_4 \cdot \frac{1}{2}H_2O$). Calcium sulfate hemihydrate can be produced by the methods described above. Calcium sulfate is described, for example, by Petersen, D. J., et al. "Calcium Compounds (Calcium Sulfate)," *Kirk-Othmer Encyclopedia of Chemical Technology,* (1992 4th ed.), vol. 4, pp. 812–26, the disclosure of which is hereby incorporated herein by reference.

As is known by those of skill in the art, there are two types of calcium sulfate hemihydrate, the α-hemihydrate form and the β-hemihydrate form. These two forms are typically produced by different types of calcination processes and differ structurally to some extent. Either type of calcium sulfate hemihydrate is suitable for use with the invention.

Other dry ingredients are preferably included in the core composition, including an accelerator which can be used to control, within certain limits, the crystal growth rate and the set time of the stucco. Examples of suitable accelerators include ball mill accelerators ("BMA") and potassium sulfate, although many others are known to those of skill in the art. In some cases, the invention may require increased amounts of accelerator.

An antidessicant such as starch may also be included in order to prevent the dehydration of calcium sulfate dihydrate crystals formed during setting of the core composition. In some products, additional lightweight aggregates (e.g., expanded perlite or vermiculite) can be included in the dry ingredients.

An aqueous solution of paper pulp is also included in the core composition. The pulp solution comprises water and paper fibers ("paper pulp"), and may also include a retarder, corn starch, and/or potash. The retarder is used in conjunction with the aforementioned accelerator in order to tailor the set time of the core composition. Retarding agents are typically used in the invention at very low rates (if at all), for example, at about 0.0007 weight percent based on the weight of the core composition.

The paper pulp solution can also include one or more of a number of additives that increase the fluidity of the slurry and/or reduce the water requirements of slurry. Materials used as fluidity-enhancing and/or water-reducing agents include "lignosulfonates" which are available commercially either in liquid or powder form. Diloflo GB 33, a sodium salt of napthalene sulfonate, available from Henkel Corporation, Ambler, Pa., may also be used as a water reducing agent. Agents supplied in liquid form can be either incorporated in the pulp solution or added directly to the mixing operation.

The pulp solution can be prepared by blending or mixing the above ingredients with water in a blending apparatus. Alternatively, a concentrated pulp solution using only a small volume of water can be used. In this case, the remainder of the core mix water requirement is made up by adding additional water. An excess of water with respect to the above-described rehydration reaction is preferably included in order to provide satisfactory flowability of the core composition. Typically, about 75 weight parts water are used per 100 weight parts stucco. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard. Gypsum wallboard made without fibers is typically very brittle and more susceptible to breakage during handling. The paper fibers also aid in evenness of drying during manufacture, as well as enhance the ability of the final wallboard product to accept and hold nails during installation.

As indicated above, the wet portion of the core composition also preferably includes a component that incorporates both a strength-enhancing agent and foam. Strengthening agents in the form of an acrylic polymer emulsion suitable for use in the invention are disclosed in U.S. Pat. No. 5,879,825, the disclosure of which is hereby incorporated herein by reference.

The aqueous foam of the wet portion of the core composition is prepared by mixing a "foaming agent" with water and air, and foaming the mixture in an apparatus which agitates the mixture to produce air bubbles of aqueous foam. Several such foam generating apparatuses are well known in the art.

Commonly-owned, co-pending application Ser. No. 09/427,982, the disclosure of which is hereby incorporated by reference, describes a static foam generating apparatus which can be used to produce foam in accordance with the invention. The air bubbles generated from this apparatus typically have diameters two or three times larger than those air bubbles generated by prior art methods.

Several known foaming agents may be used in accordance with the methods of the invention. The foaming agents may be supplied in either liquid or flake (powdered) form, and may be produced from soaps and surfactants known in the art. The methods of the invention require that a foaming agent producing less stable air bubbles be used in conjunction with a foaming agent producing more stable bubbles. The foaming agent producing less stable air bubbles may be foamed separately from the foaming agent producing more stable air bubbles. Accordingly, the less stable air bubbles and the more stable air bubbles can be added to the gypsum slurry separately. Preferably, the two foaming agents are mixed, and foamed and added to the gypsum slurry simultaneously.

As used herein, the term "less stable air bubbles," refers to those air bubbles which frequently coalesce upon contacting another unstable air bubble during mixing of the gypsum slurry and/or while the gypsum core is setting. The term "more stable air bubbles," as used herein, refers to those air bubbles which have sufficient residence time during mixing of the gypsum slurry and/or while the gypsum core is setting such that a majority of them do not coalesce upon contacting any other air bubble.

Foaming agents that produce less stable air bubbles in accordance with the invention include alkyl sulfates having at least a ten carbon chain, alkyl ether sulfates having less than an average of 1.3 moles of ethylene oxide per mole of foaming agent, and mixtures thereof. More preferably, the foaming agent that produces less stable air bubbles is selected from the group consisting of ammonium lauryl sulfate, and alkyl ether sulfates having approximately 0.4 to 1.3 moles of ethylene oxide per mole of foaming agent. Most preferably, the foaming agent producing less stable air bubbles is described by the chemical formula $R(OCH_2CH_2)_aOSO_3M_1$, wherein R represents linear and branched hydrocarbons having a maximum molecular weight of about 169, and mixtures thereof; a is the average number of moles of ethylene oxide per mole of foaming agent and is in the range of 0.4 and 1.3; and, $M_1$ is selected from the group consisting of sodium, potassium, magnesium, ammonium, quaternary organic derivatives of ammonium, and mixtures thereof. Even more preferably, a is approximately 0.8, and $M_1$ is selected from the group consisting of ammonium and quaternary organic derivatives thereof. In a particularly preferred embodiment in accordance with the invention, the foaming agent producing less stable air bubbles is Alpha Foamer®, a commercial product available from the Stepan Company, Northfield, Ill.

Foaming agents that produce more stable air bubbles in accordance with the invention include alkyl ether sulfates having at least an average of 1.5 moles of ethylene oxide per mole of foaming agent, alkyl aryl sulfonates, C-12 to C-16 alpha sulfonated methyl esters, alpha olefin sulfonates, and mixtures thereof. More preferably, the foaming agent producing more stable air bubbles is selected from the group consisting of alkyl ether sulfates having on average between 1.5 and 2.5 moles of ethylene oxide per mole of foaming agent, sodium dodecylbenzenesulfonate, and triethanolamine dodecylbenzene sulfonate. Most preferably, the foaming agent producing more stable air bubbles is described by the chemical formula $CH_3(CH_2)_bCH_2(OCH_2CH_2)_cOSO_3M_2$ wherein b has an average value in the range of 6.5 and 7.5; c is the average number of moles of ethylene oxide per mole of foaming agent and is in the range of 1.5 and 2.5; and, $M_2$ is selected from the group consisting of sodium, potassium, magnesium, ammonium, quaternary ammonium, and mixtures thereof. Even more preferably, c is approximately 2.2, and $M_2$ is selected from the group consisting of sodium, ammonium, and quaternary organic derivatives of ammonium. In a particularly preferred embodiment in accordance with the invention, the foaming agent producing more stable air bubbles is Cedepal® FA-406, a commercial product available from the Stepan Company, Northfield, Ill.

The more stable air bubbles control the amount of air bubble coalescence that occurs during mixing of the gypsum slurry and/or while the gypsum slurry is setting because the more stable air bubbles do not frequently coalesce with other air bubbles. Accordingly, in the methods according to the invention, the amount of air bubble coalescence that occurs is limited by adding increased amounts of the more stable air bubbles. In the methods according to the invention, limiting the amount of bubble coalescence is important because ultimately, air bubbles will rupture if they become too large. Further, because the more stable bubbles do not frequently coalesce, incorporating greater amounts of the more stable bubbles into a gypsum slurry introduces an increased number of smaller voids into a gypsum board. A large number of small voids in a gypsum wallboard negatively affects the board's mechanical strength.

Accordingly, an acceptable weight ratio of the foaming agent producing less stable air bubbles to the foaming agent producing more stable air bubbles must provide a sufficient number of more stable air bubbles to prevent a majority of the less stable air bubbles from becoming so large (from coalescing with other less stable bubbles) that they rupture (before the slurry sets sufficiently) and thereby allow the slurry to fill those void spaces left by ruptured bubbles. However, acceptable foaming agent weight ratios must also allow the less stable bubbles to coalesce so as to provide larger voids in the gypsum composition without becoming so large as to prematurely rupture. The foaming agent weight ratio can vary widely depending on which foaming agent is used to produce less stable bubbles and on which foaming agent is used to produce more stable air bubbles.

Preferably, at least 5% by weight of the total foaming agent used produces stable air bubbles. More preferably, the weight ratio of the foaming agent producing less stable air bubbles to the foaming agent producing more stable air bubbles is in the range of 75:25 to 95:5. Even more preferably, the weight ratio of the foaming agent producing less stable air bubbles to the foaming agent producing more stable air bubbles is in the range of 85:15 to 95:5. Most preferably, the weight ratio of the foaming agent producing less stable air bubbles to the foaming agent producing more stable air bubbles is approximately 90:10.

The invention can be better understood in light of the following examples which are intended as an illustration of the practice of the invention and are not meant to limit the scope of the invention in any way.

EXAMPLE 1

Preparation of Foam

In accordance with the methods of the invention, low density foam has been generated using the static foam generating apparatus of commonly-owned, co-pending application Ser. No. 09/427,982. 10% foaming agent solutions having acceptable foaming agent weight ratios were pumped (at a desired pump setting) into a stream of foam water. Air was injected into the stream of foam water and foaming agent solution before the solution enters the static foam generating apparatus. Foam was generated as the mixture of foam water, foaming agent, and air passed through the foaming apparatus. The density of the foam produced can be controlled by varying the air flow, the surfactant concentration, and the foam water flow.

In the present invention, low density foam (11.5 to 13 lbs/cf) was produced by pumping the desired amount of the 10% foaming agent solution into a 1.66 gal/min stream of foam water and injecting 0.6 to 0.66 cf of air per minute.

EXAMPLE 2

Comparative Testing of Gypsum Wallboard Samples

According to this example, gypsum wallboard prepared in accordance with methods according to the invention is compared with gypsum wallboard prepared by prior art methods. This example demonstrates that gypsum boards formulated with preferred weight ratios of preferred foaming agents in accordance with the methods of the invention exhibit superior mechanical properties with respect to those prepared by prior art methods, thereby allowing significant weight reductions in gypsum board weight to be achieved.

All of the sample boards of this example were formulated with low density foams (11.5–13 lbs/cf). Generally, the methods of the invention require 0.37 to 0.40 lbs of foaming agent/MSF of ½ inch board. This amount of foaming agent usage represents a substantial reduction in surfactant usage with respect to prior art methods.

One manner of comparative testing which measures the mechanical strength of a gypsum panel product is a nail pull test performed in accordance with ASTM C473–99 "Standard Test Methods for Physical Testing of Gypsum Panel Products," the disclosure of which is hereby incorporated herein by reference.

A statistical line of regression analysis was performed on the board weights and nail pull test data in order to calculate board weights required to achieve various nail pull values and to calculate projected weights at standard nail pull values.

It can be seen from the data provided herein that boards prepared in accordance with the methods of the invention can be formulated at lighter weights while still maintaining sufficient mechanical strength to pass ASTM requirements. Reductions in board weight of in excess of 60 lbs/MSF can be attained by practicing the methods according to the invention.

TABLE 1

Comparative Testing of Gypsum Wallboard Samples

| Foaming Agent Weight Ratio | 100% Cedepal ® FA-406 | | 100% Alpha Foamer ® | | 90:10 weight ratio Alpha Foamer ® to Cedepal ® FA-406 | | |
| --- | --- | --- | --- | --- | --- | --- | --- |
| Board Number | 1 | 2 | 3 | 4 | 5 | 6 | 7 |
| Stucco, g | 697 | 697 | 697 | 697 | 697 | 697 | 697 |
| Accelerator (BMA), g | 2.25 | 2.25 | 2.25 | 2.25 | 2.25 | 2.25 | 2.25 |
| Water reducing agent (diloflo), g | 1.6 | 1.6 | 1.6 | 1.6 | 1.6 | 1.6 | 1.6 |
| Starch, g | 3.5 | 3.5 | 3.5 | 3.5 | 3.5 | 3.5 | 3.5 |
| Paper pulp, g | 1.6 | 1.6 | 1.6 | 1.6 | 1.6 | 1.6 | 1.6 |
| Pulp water, ml | 390 | 390 | 390 | 390 | 390 | 390 | 390 |
| Foam solution, g | 248 | 252 | 250 | 252 | 240 | 255 | 250 |
| corrected board weight, ½ inch | 1560 | 1540 | 1556 | 1531 | 1467 | 1478 | 1496 |
| average nail pull value, pounds-force (10 trials), standard deviation | 70.4 ± 3.8 | 66.7 ± 3.6 | 69.2 ± 5.5 | 65.4 ± 6.5 | 66.4 ± 3.6 | 68.2 ± 5.6 | 68.1 ± 2.3 |
| projected nail pull value at 1675 lbs/MSF | 77.9 | 75.5 | 76.9 | 74.7 | 80.0 | 81.0 | 79.8 |

TABLE 1-continued

Comparative Testing of Gypsum Wallboard Samples

| Foaming Agent Weight Ratio | 100% Cedepal ® FA-406 | | 100% Alpha Foamer ® | | 90:10 weight ratio Alpha Foamer ® to Cedepal ® FA-406 | | |
|---|---|---|---|---|---|---|---|
| projected board weight (lbs/MSF) at 77 pounds-force | 1661 | 1699 | 1677 | 1710 | 1629 | 1613 | 1633 |

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of providing void spaces in a gypsum wallboard, the method comprising:

adding air bubbles to a gypsum slurry;

mixing the air bubble-containing gypsum slurry to distribute the air bubbles throughout the gypsum slurry, the gypsum slurry forming a core composition of the gypsum wallboard;

depositing the core composition on a first cover sheet; and applying a second cover sheet over the core composition to form a gypsum wallboard;

wherein:

the slurry comprises calcium sulfate hemihydrate and sufficient water to hydrate the calcium sulfate hemihydrate;

the air bubbles are formed by separately foaming a first foaming agent in water and a second foaming agent in water;

the first foaming agent has a chemical formula $R(OCH2CH2)_aOSO_3M_1$ wherein R represents linear and branched hydrocarbons having a maximum molecular weight of about 169, and mixtures thereof; the average value of a is 0.4 to 1.3;

and $M_1$ is selected from the group consisting of sodium, potassium, magnesium, ammonium, quaternary ammonium, and mixtures thereof;

the second foaming agent has a chemical formula $CH_3(CH_2)_bCH_2(OCH_2CH_2)_cOSO_3M_2$ wherein the average value of b is 6.5 to 7.5; the average value of c is 1.5 to 2.5; and $M_2$ is selected from the group consisting of sodium, potassium, magnesium, ammonium, quaternary ammonium, and mixtures thereof;

the air bubbles formed by foaming the first foaming agent are added to the gypsum slurry separately from the air bubbles formed by foaming the second foaming agent;

the first foaming agent and second foaming agent produce air bubbles that differ in stability;

the air bubbles produced by foaming the first foaming agent are less stable air bubbles;

the air bubbles produced by foaming the second foaming agent are more stable air bubbles;

the weight ratio of the first foaming agent to the second foaming agent is 75:25 to 95:5; and the presence of said more stable air bubbles in said slurry increases the residence time of said less stable bubbles in said slurry, thereby preventing premature rupture of said less stable bubbles before the gypsum slurry sets sufficiently, and thereby preventing said slurry from filling the void spaces formed by the ruptured air bubbles.

2. The method of claim 1, wherein the weight ratio of the first foaming agent to the second foaming agent is 85:15 to 95:5.

3. The method of claim 1, wherein the weight ratio of the first foaming agent to the second foaming agent is about 90:10.

4. The method of claim 1, wherein a is about 0.8, and $M_1$ is selected from the group consisting of ammonium and quaternary organic ammonium.

5. The method of claim 1, wherein c is about 2.2, and $M_2$ is selected from the group consisting of sodium, ammonium, and quaternary organic ammonium.

* * * * *